United States Patent [19]

Mizusawa et al.

[11] 3,777,496
[45] Dec. 11, 1973

[54] VACUUM TYPE SERVO DEVICE

[75] Inventors: Mitutoyo Mizusawa, Chiisagata-gun; Hiroo Takeuchi, Kitasaku-gun, both of Japan

[73] Assignee: Nisshin Kogyo Kabushiki Kaisha, Ueda-shi, Nagano-ken, Japan

[22] Filed: July 5, 1972

[21] Appl. No.: 269,254

[30] Foreign Application Priority Data
Sept. 7, 1971  Japan.................................. 46/69079

[52] U.S. Cl.................................... 60/593, 60/557
[51] Int. Cl................................................ F15b 7/08
[58] Field of Search..................... 60/54.5 P, 54.6 P, 60/555, 556, 557, 593; 137/DIG. 2

[56] References Cited
UNITED STATES PATENTS

| | | | |
|---|---|---|---|
| 3,259,146 | 7/1966 | Hager............................... | 60/54.6 P |
| 1,819,452 | 8/1931 | Wright............................ | 137/DIG. 2 |
| 3,050,945 | 8/1962 | Maynard......................... | 60/54.6 P |
| 2,900,962 | 8/1959 | Ingres.............................. | 60/54.6 P |
| 2,894,490 | 7/1959 | Ingres.............................. | 60/54.6 P |
| 1,915,553 | 6/1933 | Shindel.......................... | 137/DIG. 2 |
| 2,027,458 | 1/1936 | TePos............................. | 137/DIG. 2 |

FOREIGN PATENTS OR APPLICATIONS

| | | | |
|---|---|---|---|
| 606,520 | 9/1954 | Canada.............................. | 60/54.6 P |

*Primary Examiner*—Martin P. Schwadron
*Assistant Examiner*—A. M. Zupcic
*Attorney*—Eric H. Waters et al.

[57] ABSTRACT

A vacuum type servo device exhibiting an improved output pressure characteristic and free from any substantial echoing in the vacuum servo actuator. It includes a lost motion connection between the actuator rod and the hydraulic piston and a control valve arranged between the input and output fluid chambers of the hydraulic cylinder and which is normally open and closable upon initiation of the actuator operation. It also includes cushioning means arranged between the hydraulic piston and the actuator casing.

2 Claims, 3 Drawing Figures

VACUUM TYPE SERVO DEVICE

DETAILED DESCRIPTION

This invention relates to vacuum type servo devices and more particularly to those of the kind adapted for use with oil-hydraulic brakes on vehicles and operable by vacuum, for example, intake-manifold vacuum of an internal combustion engine.

Generally, servo devices of the kind described are so designed that if the vacuum servo actuator get out of order input fluid is allowed to proceed to the output side of the hydraulic assembly, as of an automotive braking system, so as to enable the latter to operate at least under the effect of such input fluid. In other words, upon failure of the vacuum servo actuator the input and output fluid chambers in the hydraulic cylinder are placed in communication with each other by means of a control valve arranged between the fluid chambers. Such control valve, however, is held closed to preclude any fluid communication between the fluid chambers as long as the vacuum servo actuator is in a normal operative state. Such arrangement has usually involved various disadvantages including, among others, awkward feeling in pedal operation due to abrupt pressure rise in the fluid chambers occurring at the initial stage of operation of the device and more or less echoing in the vacuum servo actuator caused by the impacting blow of the hydraulic piston at the end of its return stroke.

It is a primary object of the present invention to provide in a vacuum type servo device of the kind described a control valve which is designed to operate with initial movement of the output member of the vacuum servo actuator while ensuring normal output operation of the hydraulic piston.

Another object of the present invention is to provide a vacuum type servo device of the kind described which is designed to ensure that the output fluid pressure of the hydraulic assembly is kept substantially proportional to the input fluid pressure even in the initial stage of operation in which the input fluid pressure is increased under the action of the servo actuator.

A further object of the present invention is to provide a vacuum servo device of the kind described which is so adapted that the hydraulic piston coming to stop at the end of its return stroke effects no such impact against the associated stop means as may cause echoing in the vacuum servo actuator.

These and other objects, features and advantages of the present invention will become apparent from the following description when taken in conjunction with the accompanying drawing, which illustrates one preferred embodiment of the invention and in which.

Figure 1:
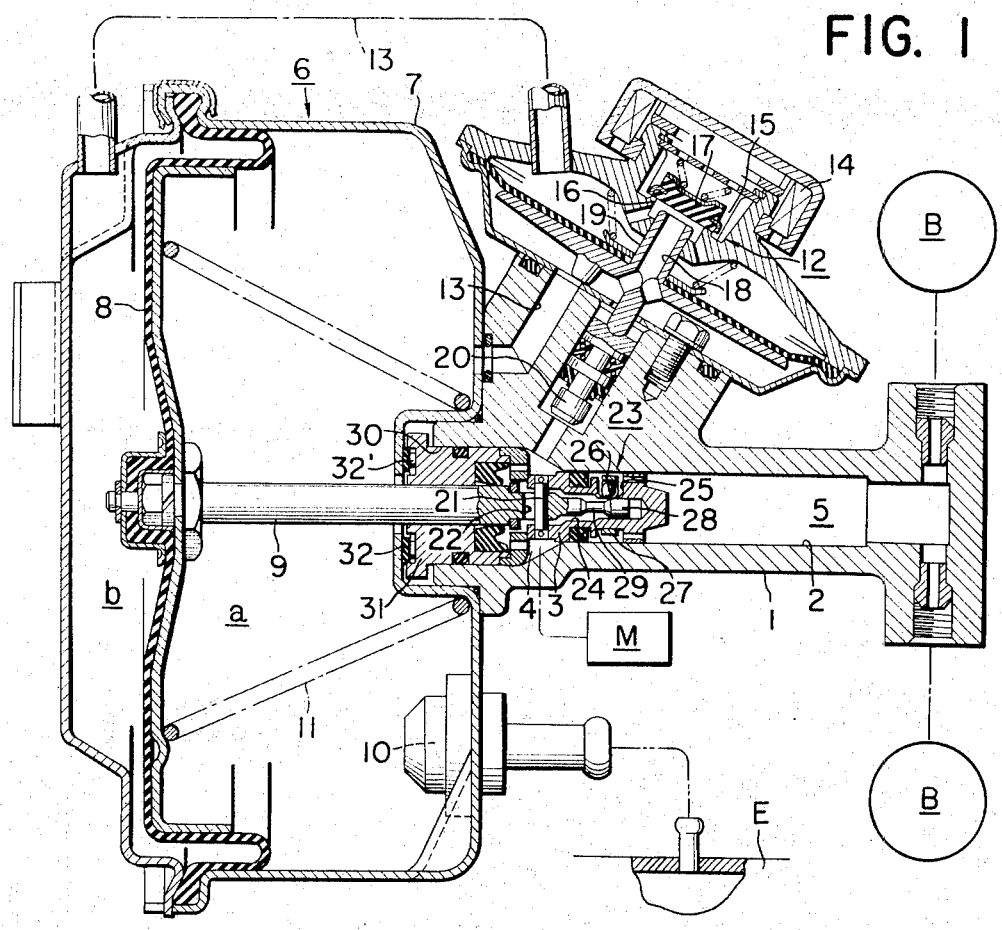
FIG. 1 is a longitudinal cross sectional side elevation of the device embodying the present invention.

Referring to the drawing and particularly to FIG. 1, reference numeral 1 indicates a hydraulic cylinder structure defining therein a cylindrical hydraulic space 2 and in which a hydraulic piston member 3 is slidably fitted to define on the opposite sides thereof an input fluid chamber 4 and an output fluid chamber 5. As shown, the input fluid chamber 4 is connected to a master cylinder M, which is operated by the vehicle driver, while the output fluid chamber 5 is in communication with appropriate hydraulic brakes indicated at B, B.

Reference numeral 6 indicates a vacuum servo actuator secured to the cylinder structure 1 at one end thereof and including a casing 7, a diaphragm 8 defining two vacuum chambers $a$ and $b$ in the casing 7 and an actuator rod 9 secured at its base end to the diaphragm 8 and at the other, forward end to the hydraulic piston member 3. One of the vacuum chamber $a$ is in communication with the intake-manifold E of an appropriate internal combustion engine and thus held energized with the engine intake-manifold vacuum as a servo amplifying power and, in this chamber a coiled compression spring 11 is arranged between the diaphragm 8 and the actuator casing wall adjoining the cylinder structure 1 to serve the purpose of restoring the diaphragm 8 to its normal position. The other vacuum chamber $b$ is so arranged as to be selectively connected to the vacuum chamber $a$ or to the atmosphere under the control of a switching valve 12 described below whereby the diaphragm 8 is operable under the pressure difference as caused between the two vacuum chambers.

The switching valve 12 is arranged in a passage 13 interconnecting the vacuum chambers $a$ and $b$. Branching from the passage 13 is a vacuum leak passage 15 which is exposed to the atmosphere by way of an air cleaner 14. At the junction between the passages 13 and 15 there is formed a valve aperture 16 over which a disc valve 17 is spring-biased to seat. A pressure member 19 is arranged under the disc valve 17 in axial alignment therewith and is formed with an axial vacuum bore 18 and an axial downward extension which is held in engagement with a piston element 20 operable under the pressure of input fluid as fed to the hydraulic cylinder 1. Thus, when the piston element 20 is operated, the disc valve 17 is raised to open the valve aperture 16 while closing the axial bore 18 in the pressure member 19.

It is to be noted that the actuator rod 9 is connected with the hydraulic piston member 3 by lost motion means allowing limited axial movement of the actuator rod 9 relative to the piston member 3. Specifically, the piston member 3 has an axial bore 24 to receive the forward end portion of the actuator rod 9 and carries a connecting pin 21 extending diametrically across the axial bore 24 and slidably fitted in an elongated slot 22 formed in the end portion of the actuator rod 9. With this arrangement, it will readily be understood that in operation the actuator rod 9 is initially allowed to move forward independently from the piston member 3 over a predetermined distance corresponding to the axial clearance afforded by the pin and slot engagement between the actuator rod 9 and piston member 3. Such initial preceding movement of the actuator rod 9 is utilized to close a control valve 23 provided in a passage intercommunicating the input and output fluid chambers 4 and 5 of the hydraulic cylinder structure 1. The construction and operation of the control valve 23 will next be described.

As shown, the axial bore 24 formed in the piston member 3 is always in communication with the input fluid chamber 4 and is closed at the forward end. Also formed in the piston member 3 is a radial bore 25 which communicates the axial bore 24 with the output fluid chamber 5. A ball valve element 26 is arranged in the radial bore 24 and normally biased to seat against a seat formation on the inner end of the bore 24 by an annular spring 27 encircling the piston member 3. To serve the purpose of operating the ball type control valve, the actuator rod 9 has an integral spoollike valve-controlling formation on its forward end, including a terminal land portion 28 and a reduced diameter portion 29 lying adjacent thereto. It is to be understood that in the normal or retracted position of the actuator rod 9, the land portion 28 is in engagement with the ball valve element 26 to keep the control valve 23 in open position and that when the actuator rod 9 is driven forward the reduced diameter portion 29 is placed in alignment with the ball valve element 26 with the initial axial movement of the actuator rod 9 relative to the piston member 3 and thus allows the ball valve element 26 to close the radial bore 25 under the bias of annular spring 27.

Figure 2:
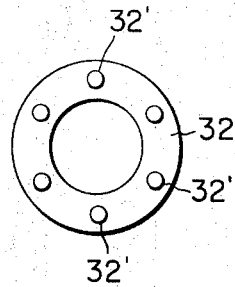
FIG. 2 is a detached plan view of one component of the device.

On the other hand, a plug member 31 is slidably fitted in the open end of the input fluid chamber 4 of the hydraulic cylinder structure 1 for abutting engagement with the hydraulic piston 3 being retracted. A cushioning member 32 is interposed between the rear end face of the plug member 31 and the adjacent wall of the actuator casing 7. As shown in FIG. 2, the cushioning member 32 is formed on its end face adjacent to the plug member 31 with a number of circumferentially spaced projections 32' designed in a suitable size to produce an additional cushioning effect. Further, in order to prevent the cushioning member 32 from being stressed excessively, it is desirable to arrange so that the plug member 31 is placed in direct engagement with the actuator casing 7 when the cushioning member 32 is compressed to a definite extent.

Description will next be made of the operation of the device described.

First, when the master cylinder M is actuated, for example, by pedal operation, to energize the input fluid chamber 4 of the hydraulic cylinder 1, the input fluid pressure thus fed in the chamber 4 acts through the piston element 20 upon the pressure member 19 to force up the latter and together therewith the disc valve 17 is raised to open the valve aperture 16 while at the same time closing the vacuum bore 18. The opening extent of the valve aperture 16 is determined by the amount of axial displacement of the piston element 20 and hence by the valve of the input fluid pressure. It is to be noted that as the valve aperture 16 is opened the leakage of vacuum from the vacuum chamber $b$ to the atmosphere is increased so that the pressure in the chamber $b$ is allowed to rapidly approach the atmospheric pressure. In this manner, there is produced between the two vacuum chambers 4 and 5 a pressure difference sufficient to cause operative movement of the actuator diaphragm 8.

In the operative movement of the actuator diaphragm 8, effected to the right as viewed in FIG. 1, the actuator rod 9 is initially allowed to precede the hydraulic piston member 3 by the pin and slot connection provided therebetween, effecting axial forward movement retative to the piston member 3 over a distance corresponding to the axial play in the connection. This initial movement of the actuator rod 9 causes the control valve 23 to close to disconnect the input and output fluid chambers 4 and 5 from each other and subsequently the actuator rod 9 is brought into direct engagement with the piston member 3 to drive it forwardly thereby to build up in the output fluid chamber 5 a high fluid pressure effective to operate the hydraulic brakes B, B.

Figure 3:
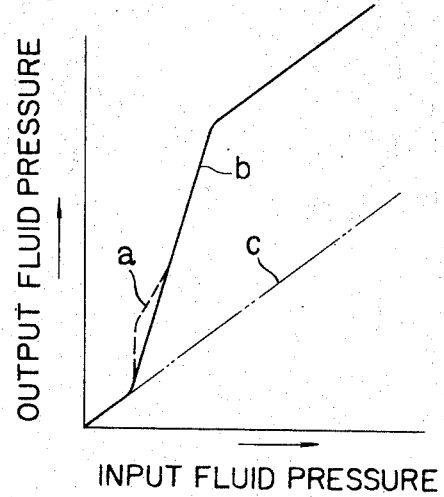
FIG. 3 is a graphic representation of the output fluid pressure characteristic of the device.

Incidentally, the initial movement of the actuator rod 9, that is, its axial movement prior to the seating of the ball valve element 26 tends to cause an abrupt pressure rise in the output fluid chamber 5, as illustrated in FIG. 3 by the broken line $a$, since in such movement the actuator rod 9 being relatively small in diameter acts instantaneously forcefully to pressurize the input fluid chamber 4 and the instantaneously increased fluid pressure is transmitted to the output fluid chamber 5 through the fluid passage 24-25 still held open in the piston member 3. Such abrupt pressure rise in the output fluid chamber 5, however, is effectively alleviated according to the pressent invention by the provision of cushioning member 32, arranged on the rear side of the plug member 31. As will readily be appreciated, the plug member 31 is slightly displaced rearward to compress the cushioning member 32 at the instant when the pressure in the input fluid chamber 4 is suddenly increased, with the result that the fluid pressure in the output fluid chamber 5 is kept substantially proportional to the input fluid pressure, as indicated in FIG. 3 by the solid line $b$.

Next, when the master cylinder M is released to de-energize, the fluid pressure in the input fluid chamber 4 is reduced allowing the piston element 20 to retract the switching valve 17 is immediately restored to the position shown in FIG. 1 to provide communication between the vacuum chambers $a$ and $b$ and any pressure difference therebetween is eliminated allowing the actuator diaphragm 8 to retract together with the actuator rod 9 to the normal position shown under the bias of restoring spring 11. At the same time, the hydraulic piston member 3 is retracted together with the actuator rod 9 through the intermediary of the connecting pin 21 and comes to stop abutting against the front face of the plug member 31. Ordinarily, it is considered that the impact of the piston member 3 with the plug member 31 be transmitted to the actuator casing 7 to cause echoing. According to the present invention, however, it will readily be appreciated that such echoing is effectively prevented as any impact upon the plug member 15 is absorbed by the cushioning member 32 interposed between the plug member 31 and the adjacent wall of the actuator casing 7.

Further, it is to be noted that the device of the present invention is designed so as to ensure proper brake operation even upon failure of the vacuum system. That is to say, even it the vacuum servo actuator 6 be inoperable, the fluid pressure built up in the input fluid chamber 4 upon energization of the master cylinder M is directly transmitted to the output fluid chamber 5 through the axial bore 24 formed in the hydraulic piston 3 and the radial bore 25 also formed therein and normally held open by way of the ball valve 26, and the hydraulic brakes B, B are operable directly under the input fluid pressure, unaided by the vacuum servo system, and thus ensures driving safety. The double-dotted line C in FIG. 3 illustrates the output fluid pressure characteristic of the device obtained in such instance.

In brief, the construction and arrangement of the vacuum type servo device of the present invention is such that the control valve 23 normally positioned to communicate the input and output fluid chambers 4 and 5 with each other is closable prior to the operative movement of the hydraulic piston member 3 in association with the initial axial movement of the actuator rod 9 relative to the latter, eliminating any loss in ensuing output movement of the piston member 3, and that any abrupt pressure rise usually liable to occur in the input and output fluid chambers 4 and 5 in the initial stage of operation of the actuator rod 9 is effectively absorbed by the cushioning member 32 disposed on the rear side of the plug member 31 and through the intermediary of the latter, which is slidably fitted in the input fluid chamber 4, so that not only an output fluid pressure characteristic is obtained which is free from any sudden rise such as is unfavorable to the driver's feeling in brake pedal operation but also the impacting effect of the hydraulic piston 3 upon the vacuum servo actuator 6 at the end of the return stroke of the hydraulic piston 3 is effectively reduced by the provision of the cushioning member 32 to preclude occurrence of any undesirable echoing in the vacuum servo actuator 6.

While one preferred embodiment of the present invention has been shown and described herein, it will be apparent to those skilled in the art that it is susceptible to various changes and modifications without departing from the spirit of the invention as defined in the appended claims.

What is claimed is:

1. A vacuum type servo device comprising: a hydraulic assembly including a cylinder structure and a piston member slidably fitted in said cylinder structure and defining therein an input fluid chamber and an output fluid chamber on the opposite sides of the piston member; a vacuum servo actuator including a casing having a portion mounted on said cylinder and an actuator rod extending axially through said input fluid chamber in said cylinder structure and connected with said piston member for limited axial movement relative thereto; fluid passage means communicating said input and output fluid chambers with each other; control valve means arranged in said fluid passage means and closable with axial forward movement of said actuator rod relative to said piston member; a plug member slidably fitted in the open end portion of said input fluid chamber for abutting against said piston member in retracted position, and a cushioning member interposed between said plug member and said casing of said vacuum servo actuator, said cushioning member being so designed as to allow direct engagement of said plug member with said casing of said vacuum servo actuator when said cushioning member is compressed to a predetermined extent.

2. A vacuum type servo device as claimed in claim 1, in which said fluid passage means includes an axially extending bore and a radially extending bore formed in said piston member in communication with each other; and said control valve means includes a valve seat formed on said piston member at the inner end of said radially extending bore, a ball valve element fitted in said radially extending bore for seating engagement with said valve seat, and a valve controlling formation on the forward end of said actuator rod and including a terminal land portion and an adjacent reduced diameter portion operable with axial movement of said actuator rod relative to said piston member respectively to unseat and seat said ball valve element.

* * * * *